UNITED STATES PATENT OFFICE.

HERBERT LEROY MITCHELL, OF LONDON, AND GEORGE WILLIAM GOODE, OF HEATH GRANGE, SOUTH GODSTONE, ENGLAND, ASSIGNORS TO WILLIAM HENRY ARMSTRONG FITZ PATRICK, OF CRAGSIDE, ENGLAND.

COMPOSITION FOR BRIQUETING COAL AND THE LIKE.

No. 830,798.  Specification of Letters Patent.  Patented Sept. 11, 1906.

Application filed March 2, 1905. Serial No. 248,190.

*To all whom it may concern:*

Be it known that we, HERBERT LEROY MITCHELL, merchant, a citizen of the United States of America, and a resident of 45 Gillingham street, London, S. W., in the county of Middlesex, and GEORGE WILLIAM GOODE, engineer, a subject of the King of Great Britain, and a resident of Heath Grange, South Godstone, in the county of Surrey, England, have invented a new or Improved Composition for Briqueting Coal and the Like, of which the following is a specification.

Our invention relates to a new or improved composition for briqueting by means of which certain advantages are obtained.

In preparing our composition we employ linseed-foots, resin, glucose, dextrine, tapioca, sulfate of soda, sulfate of iron, and oxalic acid. We prepare the composition from these ingredients in the following manner: Taking two gallons of linseed-foots—that is to say, the residue from linseed-oil after boiling—we place this in any convenient form of mixer which can conveniently be heated, and we subject this to heat until it becomes thin and fluid. We then add finely-powdered resin slowly and gradually, while stirring or agitating. When the resin has dissolved in or mixed with the linseed-foots, we add five gallons of glucose, stirring all the time until thoroughly mixed, when we next add one gallon of dextrine and half a pound of sulfate of soda in the form of salt cake. We then add another five gallons of glucose, a quarter of a pound of sulfate of iron, and then a further gallon of dextrine and an ounce of oxalic acid. We then take one gallon of tapioca, finely ground, and mix it thoroughly with cold water in a separate vessel. When this is thoroughly mixed, we add it gradually to the mixture of ingredients previously mentioned and keep the whole stirred or agitated for a few minutes. A thickish paste is thus obtained which may afterward be diluted with water for briqueting.

The composition made up of the ingredients and compounded in the manner above described is one which we have found experimentally to give good results. The relative proportions of the ingredients may be varied to a considerable extent and in accordance with the precise material to be briqueted, and in some cases certain ingredients may be omitted altogether. Thus if the material to be briqueted be coal, but not of a very smoky nature, the oxalic acid may be omitted, and when the coal is anthracite or hard steamcoal the sulfate of iron, as well as the oxalic acid, may be omitted. In some cases it is advisable to use a larger quantity of dextrine; but if it be important to cheapen the composition this may be done by lessening the proportions both of glucose and dextrine. Our experiments show that while the variation in the proportions of the ingredients employed may be very considerable the order in which they are added is of great importance in order to give satisfactory results. The heating is also a matter of importance.

In another specific example of our composition we have found that a relative proportion of four to one of glucose and dextrine is advantageous; but as these materials, especially the glucose, may vary considerably in quality or strength the proportions should vary in accordance therewith.

What we claim as our invention, and desire to secure by Letters Patent, is—

1. In a composition for briqueting the combination of linseed-foots, resin, glucose, dextrine, tapioca and sulfate of soda, substantially as set forth.

2. In a composition for briqueting the combination of linseed-foots, resin, glucose, dextrine, tapioca, sulfate of soda and oxalic acid, substantially as set forth.

3. In a composition for briqueting the combination of linseed-foots, resin, glucose, dextrine, tapioca, sulfate of soda, oxalic acid and sulfate of iron, substantially as set forth.

4. The method of preparing the composition herein specified which consists in heating and mixing together linseed-foots, resin, glucose, dextrine, sulfate of soda, more glucose, sulfate of iron, more dextrine and oxalic acid all in the order mentioned and then mixing therewith tapioca and water, substantially in the manner set forth.

In witness whereof we have hereunto set our hands in the presence of two witnesses.

HERBERT LEROY MITCHELL.
GEORGE WILLIAM GOODE.

Witnesses:
 FRANCIS W. FRIGOUT,
 C. P. LIDDON.